(12) United States Patent
Winkler

(10) Patent No.: US 6,602,037 B2
(45) Date of Patent: Aug. 5, 2003

(54) SYSTEM FOR PICKING ARTICLES SITUATED IN RACK STORAGE UNITS

(75) Inventor: Walter Winkler, Parkstein (DE)

(73) Assignee: Witron Logistik & Informatik GmbH (DE)

( * ) Notice: Subject to any disclaimer, the term of this patent is extended or adjusted under 35 U.S.C. 154(b) by 0 days.

(21) Appl. No.: 09/810,208

(22) Filed: Mar. 15, 2001

(65) Prior Publication Data

US 2002/0021954 A1 Feb. 21, 2002

(30) Foreign Application Priority Data

Nov. 22, 2000 (DE) .......................... 100 57 735

(51) Int. Cl.⁷ .............................. B65G 1/137
(52) U.S. Cl. ................. 414/273; 414/281; 414/282
(58) Field of Search ........................ 414/273, 281, 414/282

(56) References Cited

U.S. PATENT DOCUMENTS

| | | | | |
|---|---|---|---|---|
| 4,252,217 A | * | 2/1981 | Benjamin | 187/9 R |
| 4,331,418 A | * | 5/1982 | Klebe | 414/282 X |
| 4,773,807 A | | 9/1988 | Kroll et al. | 414/282 |
| 4,787,803 A | * | 11/1988 | van Elten et al. | |
| 5,379,229 A | | 1/1995 | Parsons et al. | 364/478 |
| 5,564,890 A | | 10/1996 | Knudsen et al. | 414/786 |
| 5,582,497 A | | 12/1996 | Noguchi | 414/281 |
| 5,838,522 A | * | 11/1998 | Komvopoulos et al. | 364/478.01 |

FOREIGN PATENT DOCUMENTS

| | | |
|---|---|---|
| DE | 9404044 U | 6/1994 |
| EP | 773187 | 5/1997 |
| GB | 1049811 | 11/1966 |
| GB | 1103603 | 2/1968 |
| WO | WO9911558 | 3/1999 |

OTHER PUBLICATIONS

Heptner, Klaus; "Method of Goods Distibution and Order Filling in the United States" (1969) fordern und heben 19 (1969) Nr. 12 pp. 727–732.

European Search Report for corresponding European paten application No. EP 1 136 395 A3.

European Search Report for related European patent application No. 1 136 394 A3.

* cited by examiner

Primary Examiner—Steven A. Bratlie
(74) Attorney, Agent, or Firm—Gray Cary Ware & Freidenrich LLP

(57) ABSTRACT

The invention relates to a system for picking articles situated in a rack storage unit, comprising a plurality of parallel rack rows (60, 62, 63) for the storage of articles situated on retrieval pallets (38) and/or in containers (80), storage aisles (70) and picking aisles (72) formed alternately between the rack rows (60, 62, 63), at least one storage vehicle (56) in each storage aisle (70), which vehicle is designed to accommodate at least one retrieval pallet (38) and/or container (80) and is capable of travelling along each storage aisle (70) to place the retrieval pallets and/or containers into storage in the pallet racks, at least one picker vehicle (10) in each picking aisle (72) for picking the articles to be picked, which is capable of travelling along in each case one of the two mutually opposing picking fronts forming the picking aisle (72), buffer locations (64), which are disposed in the picking aisles (72) between the routes of the picker vehicles (10) travelling along the two opposing picking fronts, for the intermediate storage and/or transfer of the pick articles from a picker vehicle (10) at one side of the picking aisle (72) to a picker vehicle (10) at the other side of the picking aisle (72), and a system controller comprising a control computer. Besides the storage and retrieval of pallets, the system according to the invention according to a preferred embodiment also allows the storage and retrieval of containers (80) for smaller articles.

45 Claims, 13 Drawing Sheets

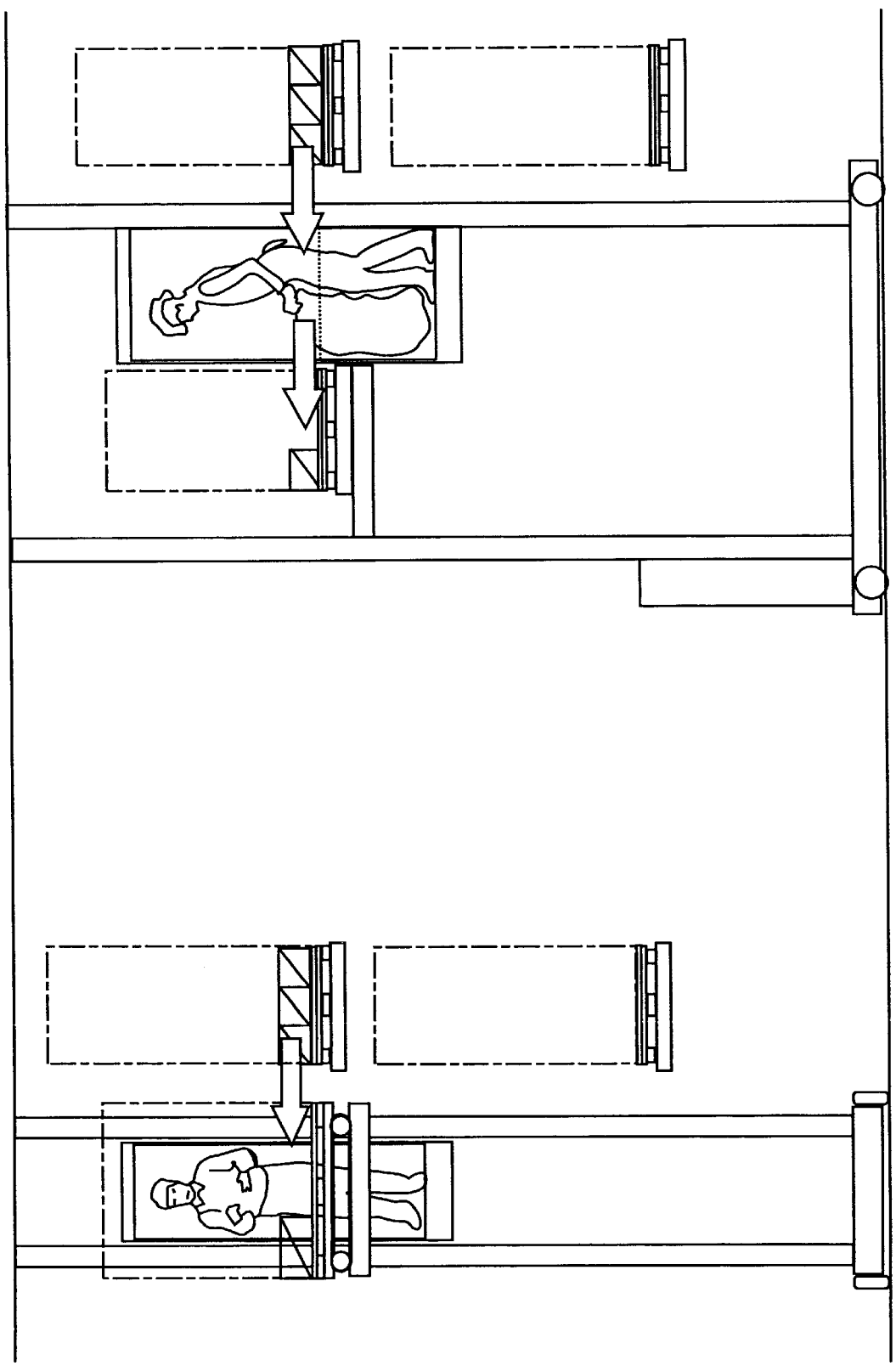

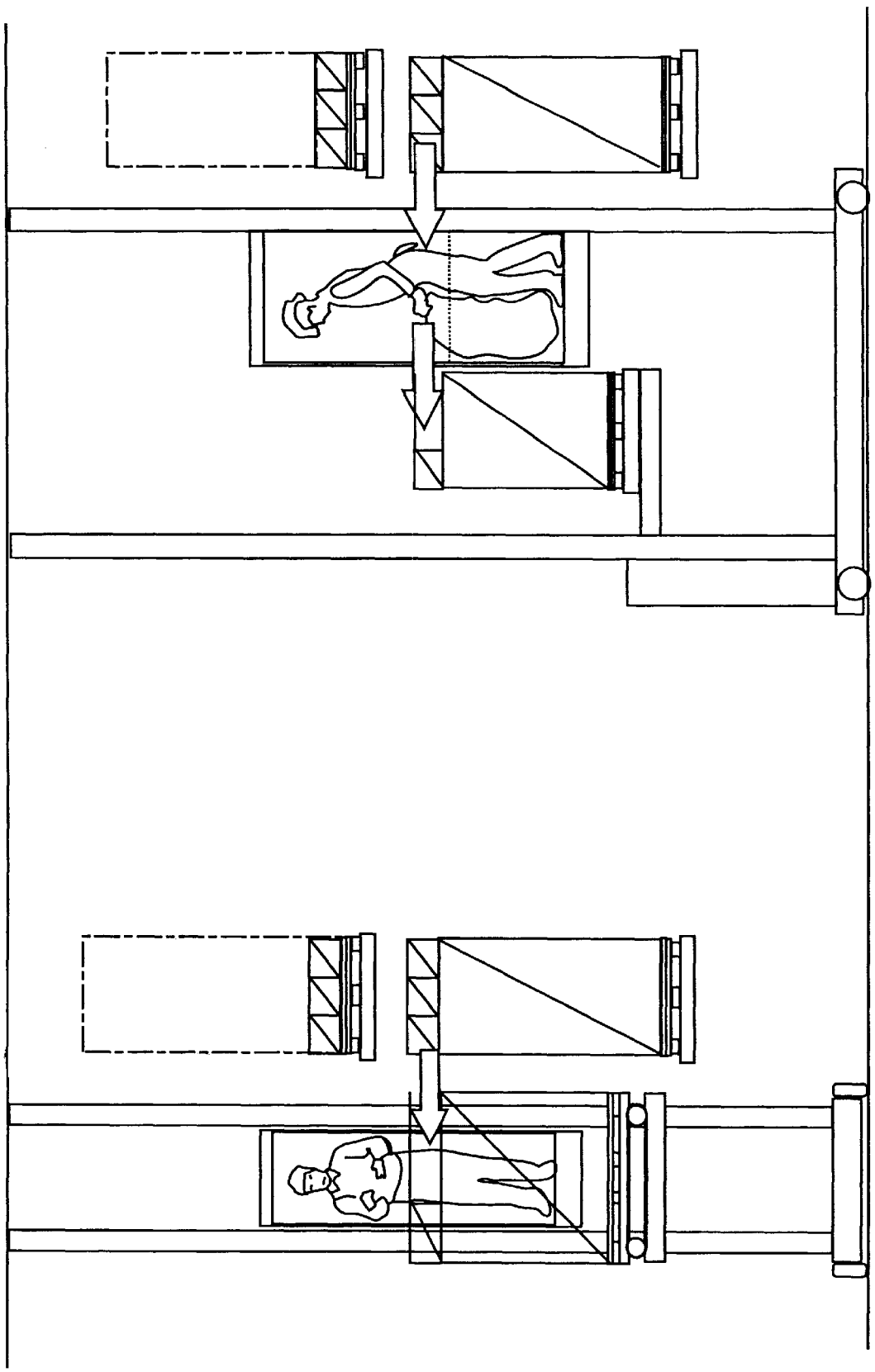

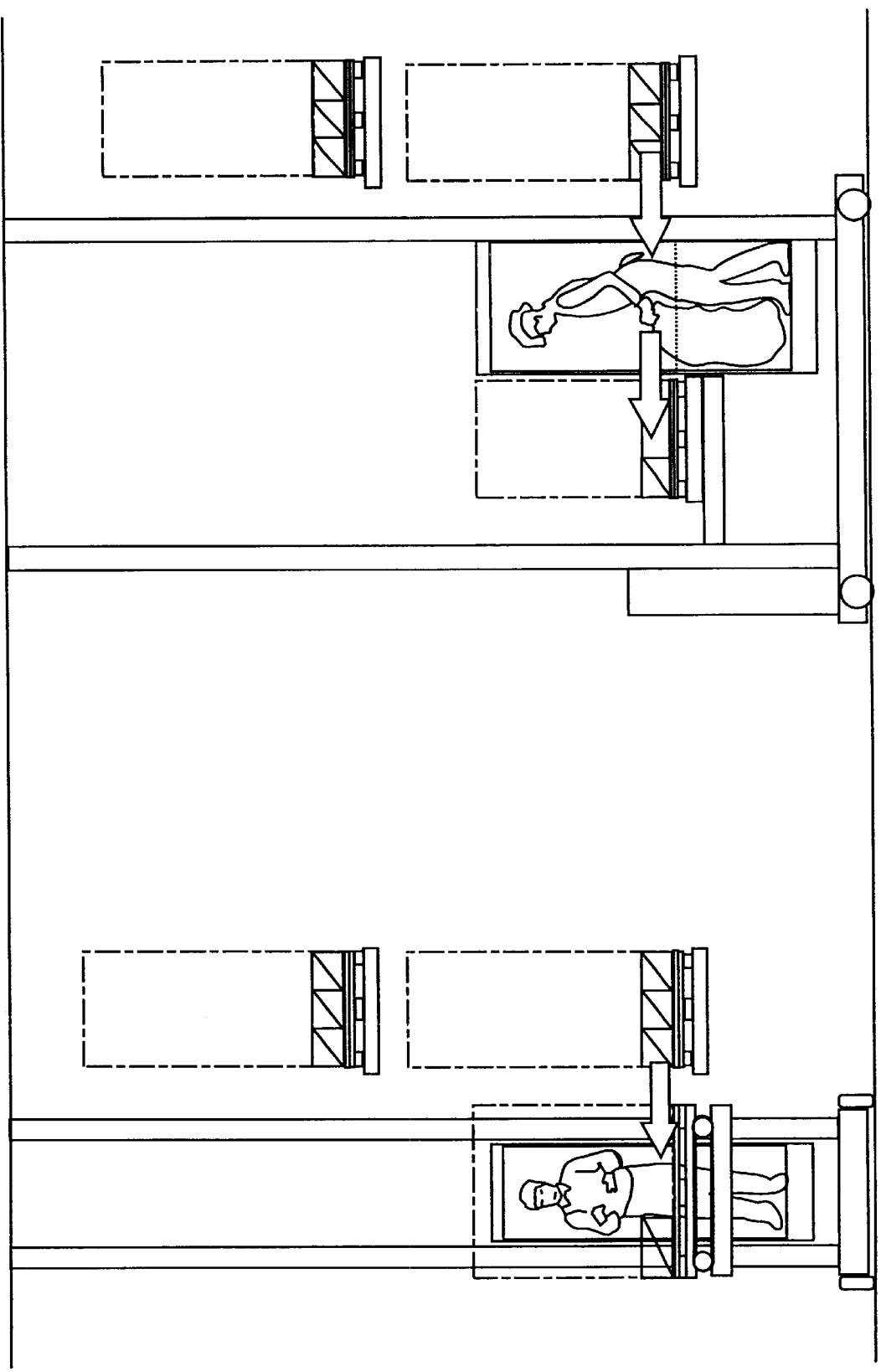

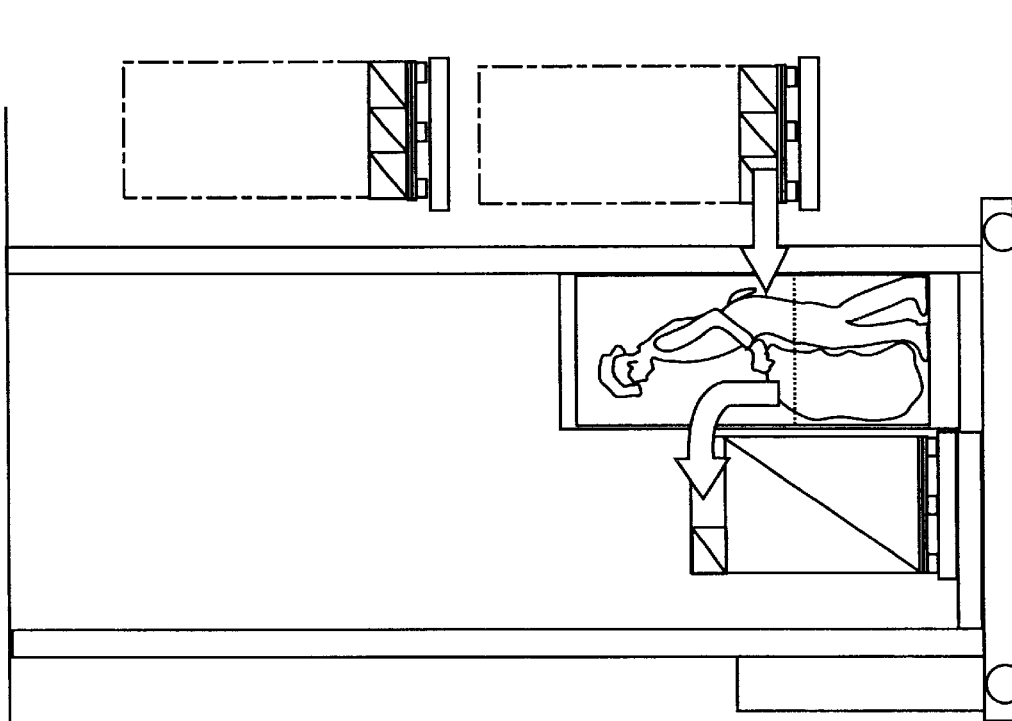
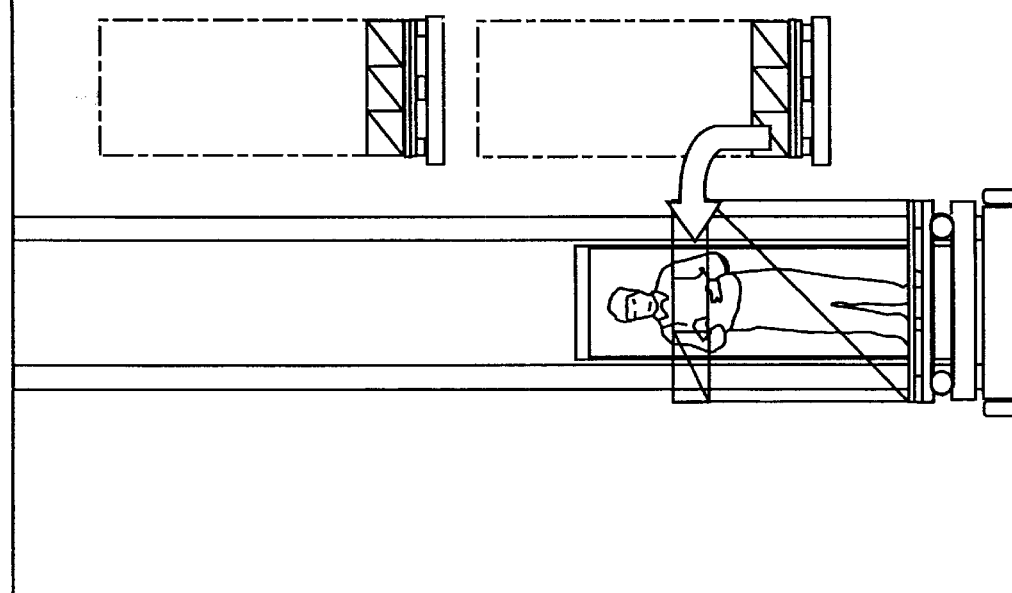

SYSTEM FOR PICKING ARTICLES SITUATED IN RACK STORAGE UNITS

RELATED APPLICATION

This application claims priority from German Patent No. DE 100 13 213.8 filed on Mar. 17, 2000, which is incorporated herein in its entirety.

The invention relates to a system for picking articles situated on retrieval pallets or in special containers in rack storage units.

FIELD OF THE INVENTION

The object of the invention is substantially to provide a system of a kind which is notable primarily for combining extreme flexibility and high efficiency with optimum ergonomics.

SUMMARY OF THE INVENTION

Said object is achieved substantially by a system of the type described initially, comprising: 1) a plurality of parallel rack rows for the storage and intermediate storage of units for receiving the articles, 2) storage aisles and picking aisles formed alternately between the rack rows, 3) at least one storage vehicle in each storage aisle, which vehicle is designed to receive at least one unit and is capable of traveling along each storage aisle to place the units into storage in the pallet racks, 4) at least one picker vehicle which in each picking aisle, for picking the articles to be picked, is capable of traveling along in each case one of the two mutually opposing picking fronts forming the picking aisle, 5) buffer locations, which are disposed in the picking aisles between the routes of the picker vehicles traveling along the two opposing picking fronts, for the intermediate storage and/or transfer of the pick units from a picker vehicle at one side of the picking aisle to a picker vehicle at the other side of the picking aisle, and 6) a system controller comprising a control computer.

The said storage and/or supply vehicle is preferably also used to transport the units from picking aisle to picking aisle.

In a preferred development of the invention, it is provided that in each of the rack rows at least one buffer track is constructed for transferring order pallets from a picker vehicle to a storage vehicle and from there optionally to a picker vehicle of the adjacent picking aisle, and/or for transferring an order pallet from a storage vehicle to a picker vehicle. It is also possible for there to be only one picking aisle between the pallet racks. The previously described transfer and buffer locations are then situated in the pallet racks.

The system according to the invention allows single-stage picking directly onto the dispatch loading aid, namely the pallet, wherein only a single handling stage is required. Transporting of the order pallet from the start of the order up to sorting for dispatch is effected automatically by the picking system by means of buffer conveyors. The invention allows optimization of the completion time by prioritizing specific order pallets: because the invention creates the possibility of transferring the order pallets between the picker vehicles of a picking aisle via the buffer locations and the possibility of transferring the order pallets from one picking aisle to an adjacent picking aisle via the buffer tracks in the pallet racks and the respectively associated storage vehicle, order pallets may overtake one another as they run through the system. Thus, orders may be processed in a prioritized manner and passed through the installation as quickly as possible irrespective of the number of order pallets already started in the installation. It is moreover possible, by means of the buffer locations provided according to the invention, to control the work load variations of the pickers.

The system according to the invention is particularly suitable for picking articles stored on pallets from pallet racks. However, the system is also advantageously usable to pick smaller articles, which are accommodated in special storage containers and/or small load carriers KLTs or in cardboard boxes. Said storage containers may be integrated into a pallet rack either in specific storage channels, which are adapted to the dimensions of the storage containers, or by means of mobile storage channel inserts, which are inserted into the pallet channels. It is further possible to provide a separate rack module designed exclusively for picking from storage containers. The extra provision of storage space in the storage containers in addition to the pallet locations enables efficient storage and picking also of smaller articles and slow-moving articles. By virtue of the storage containers or small load carriers a reduction of the picking front and hence of the picking distance is achieved. Because of the shorter journey times a higher picking capacity and shorter order completion times are possible.

In a preferred development of the invention, it is provided that both static and dynamic picking channels are formed at the pallet racks. In the present case, the picking channels of the pallet racks are preferably designed so as to be usable both as static and as dynamic picking channels.

"Static channels" in the context of the invention are those picking channels of the pallet racks, to which articles with a high turnover are assigned within the framework of permanent pick-up locations for picking (static line-up). In the static channels there is always a plurality, preferably two to three pallets of the respective article provided one behind the other. Picking is effected from the front pallet associated with the picking front, the pallets behind are provided as stock. When the front pallet is empty, the pallet is removed by the picker and the follow-up pallets automatically roll forward by means of gravity roller conveyors. The zero passage acknowledgement of the picker triggers the provision of a new pallet from the stock area.

"Dynamic channels" in the context of the present invention are those picking channels of the pallet racks, in which pallets holding articles with a low turnover are lined up for picking dynamically, i.e. only when actually required, thereby reducing the size of the picking front. Specific picking channels are earmarked for dynamic line-up. When there is a request from the picking system for a dynamic article, the latter is lined up at the dynamic location and, upon a request for a new article, is removed and returned to the stock area.

Since at least some but preferably all of the picking channels are equipped so as to be usable both as static and as dynamic picking channels, the possibility arises of continuous reprofiling of the article line-up. To said end, in a preferred development of the invention it is provided that the system comprises control means for determining on the basis of records and/or prognoses and/or present orders the optimum article line-up and, in the event of a variation of definable magnitude from this, reorganizing, i.e. reprofiling the picking front. The design of the picking channels allows an automatic return of a lined-up pallet to the stock area. If a static article is to be changed, the appropriate pallets are removed from the picking channel. The picking channel may then be either statically or dynamically reassigned. Thus, a continuous reprofiling of the article line-up during operation is possible without intervention by the workforce.

Although storing of the pallets in the stock area and feeding of the pallets into the picking channels might in principle also be effected by manual stackers controllable by radio data transmission, in a preferred development of the invention it is provided that the storage vehicles take the form of automatic rack attendance units.

In the case of the present invention, stock and picking are integrated in a single system, the system according to the invention, which guarantees short servicing times. Larger quantities of stock may optionally be accommodated in a separate storage area, preferably a high-rack pallet store with a conveyor link to the system according to the invention.

The picker vehicles of the system according to the invention accommodate not only the order pallet but preferably also the picker so that the order pallets plus the picker are channelled by means of the picker vehicle successively through the picking fronts where articles for the order pallet are lined up. Automatic travel to the picking positions and automatic positioning in front of the respective picking channel is effected. As a result, waiting times of the pickers are reduced and walking distances of the pickers during picking are eliminated. As the order pallet is always carried along, there are no journey times to the order pallet.

In a preferred development of the invention it is provided that the picker vehicle carries the order pallet and the picker in a height-adjustable manner. It is particularly advantageous when the picker vehicle carries the order pallet in a height-adjustable manner relative to the picker.

In a particularly preferred development of the invention, this may be achieved in that a first lifting device with a height-adjustable picker-carrying device for the picker and a second lifting device with a height-adjustable pallet-carrying device for an order pallet are provided, wherein the picker-carrying device and the pallet-carrying device are positionable heightwise relative to the respective retrieval position independently of one another.

The picker situated on the picker-carrying device may be conveyed along the picking front by means of the vehicle. The two independently operating lifting devices of the vehicle make it possible to achieve the, in each case, ergonomically most advantageous retrieval height and delivery height for the picker-carrying device and pallet-carrying device respectively. By said means, the stresses imposed on the picker by stooping and lifting and taking down boxes from suboptimum retrieval and delivery heights are avoided. Automatic travel to the retrieval positions eliminates walking distances for the picker during picking, which leads to a substantial reduction of journey times and makes the picking process more efficient. The preferably provided computer control of the apparatus also eliminates the time taken by the picker in conventional systems to find the next retrieval position (orientation to the next bay).

In an advantageous development of the invention, the picker-carrying device comprises a cabin for the picker. Said cabin is preferably provided with a circumferential crash guard for the picker and comprises a terminal for displaying the picking positions. As an additional safety device, a dead man's switch is advantageously provided, which may be used simultaneously to acknowledge the pick.

In a preferred development of the invention, the pallet-carrying device comprises a load-receiving means for receiving and delivering an order pallet. The load-receiving means is advantageously designed so as to enable transporting of the order pallet at right angles to the travelling direction of the vehicle.

In a particularly preferred development of the invention, the pallet-carrying device comprises a sensor device for determining the degree of charging of the order pallet, thereby enabling the height of the pallet-carrying device to be adapted to the degree of charging of the order pallet.

The picker vehicle is conveyed on rails along the picking front in a similar manner to a storage and retrieval unit and is controlled by the control computer. The vehicle is moved in longitudinal direction in accordance with the pick controller to the respective retrieval position in front of the respective active retrieval pallet and, preferably at the same time, both the picker and the order pallet are moved into an optimum vertical position. The picker may then retrieve the quantity displayed at the terminal from the retrieval pallet and transfer it to the order pallet. The picker vehicle is then steered to the next relevant retrieval position or moved to a transfer location.

In a preferred development of the invention, it is provided that the height of the picker-carrying device at the respective retrieval position is controllable on the basis of the residual stock quantity of the articles on the retrieval pallet. It is further provided that the height of the pallet-carrying device at the respective retrieval position is controllable on the basis of the degree of charging of the order pallet. In said manner it is possible to achieve an ergonomically optimum retrieval and delivery height of picker-carrying device and pallet-carrying device at any time during picking, thereby reducing the physical stress on the picker to a minimum; in particular, no strain is placed on the spinal column of the picker during the picking process.

In addition, it is advantageously provided that the height of the picker-carrying device and/or of the pallet-carrying device at the respective retrieval position is adjustable individually for each picker, i.e. in the controller the optimum access height may be geared individually to each worker. Furthermore, it is advantageously provided that the heights preset by the controller are manually correctable by the picker. In contrast, control of the travel in aisle direction is preferably effected fully automatically without the possibility of intervention by the picker.

Further advantageous features of the invention arise from the remaining sub-claims and from the following detailed description of a preferred embodiments of the invention with reference to the drawings.

BRIEF DESCRIPTION OF THE DRAWINGS

Said drawings show in a diagrammatic and semi-diagrammatic manner.

First embodiment: system for picking from pallets

DETAILED DESCRIPTION

Figure 1:
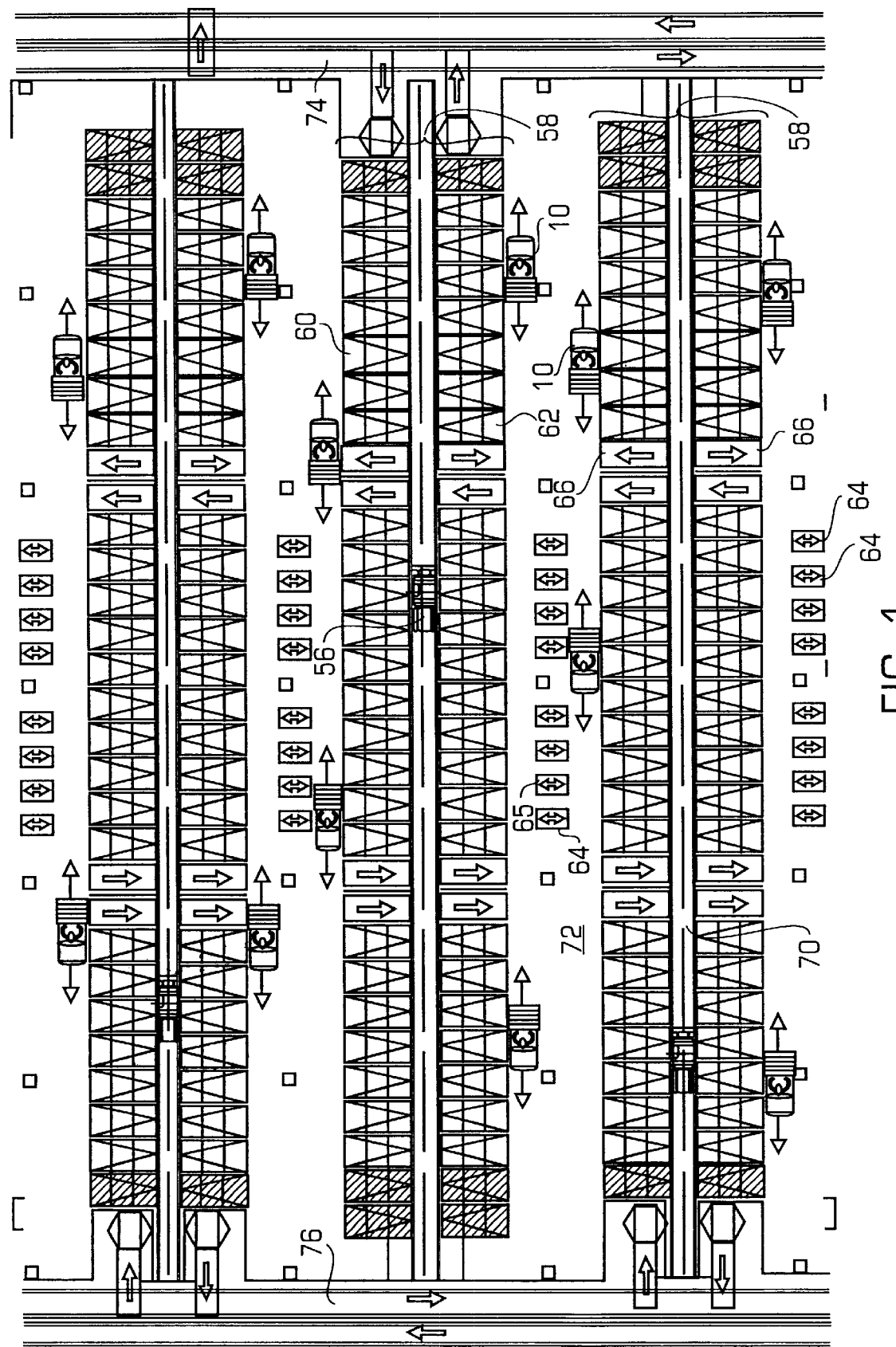
FIG. 1 a plan view of an embodiment of a system according to the invention.
Figure 2:
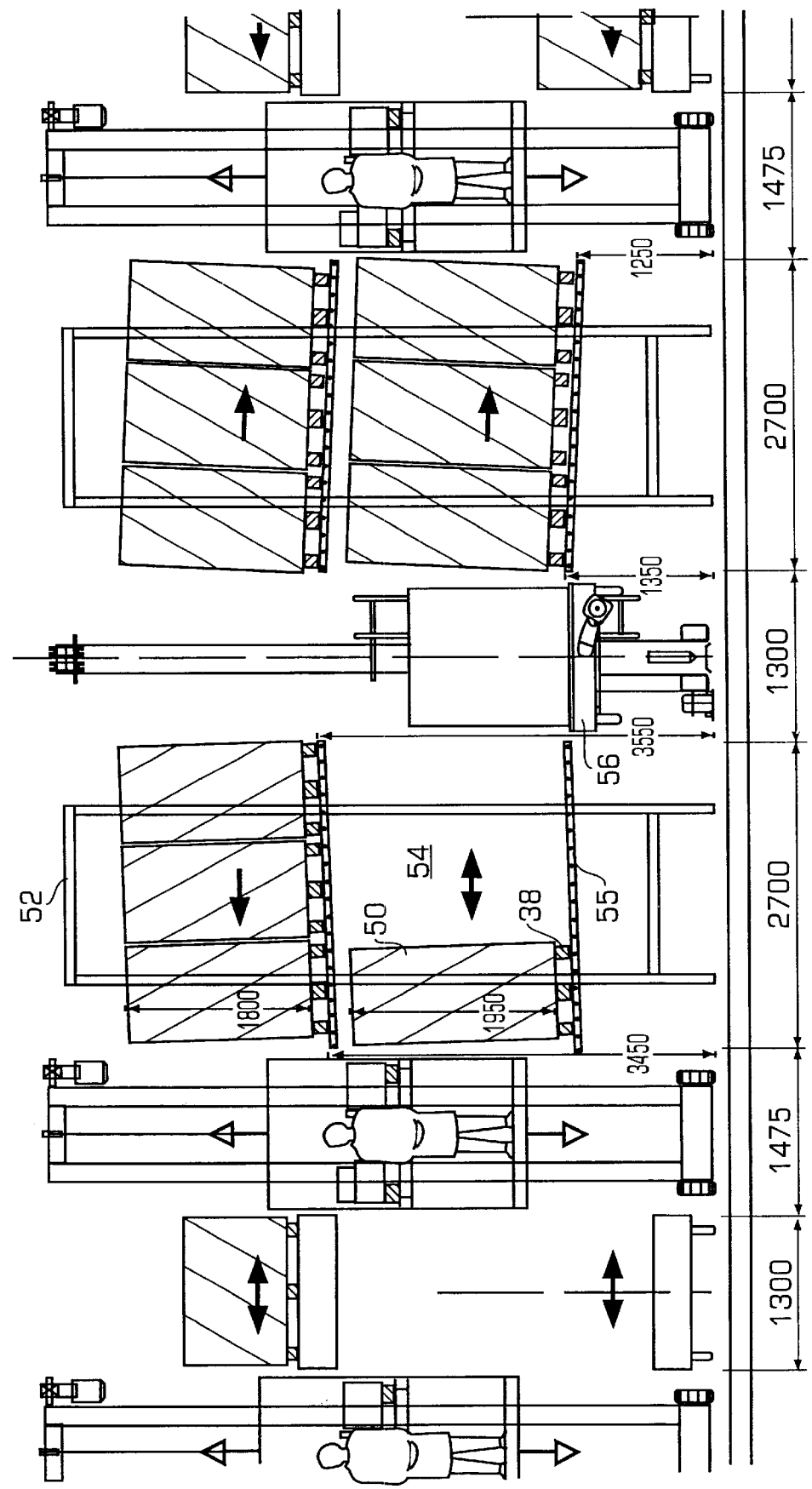
FIG. 2 a cutout from a vertical section through the system according to FIG. 1.

Reference is first made to FIGS. 1 and 2, which show a system for the integrated storage of, and picking from pallets.

The system according to the invention comprises a number of parallel rack rows 60, 62, wherein in each case two adjacent rack rows 60, 62 define a storage aisle 70 and a picking aisle 72. In each of the storage aisles 70 there is a mobile rack attendance unit 56. Along the picking fronts of the rack rows 60, 62 directed towards the picking aisles 72 in each case two picker vehicles 10 may travel on rails. Each of the picker vehicles 10 (as a rule) carries a picker 18 and an order pallet 20. Arranged in the centre of each picking aisle, i.e. on the one hand, centrally between the respective routes of the picker vehicles of opposing picking fronts and, on the other hand, likewise centrally viewed in longitudinal direction of the picking aisle, are buffer locations 64, onto which order pallets may be deposited by the picker vehicles and/or from which deposited order pallets may be picked up by the picker vehicles. It is also possible for there to be only one picking aisle between the pallet racks. The previously described transfer and buffer locations are then situated in the pallet racks.

Disposed at either end of the storage aisles 70 and picking aisles 72 and/or of the rack rows 60 and 62 and extending at right angles thereto are conveying tracks 74, 76, which are to be associated with the conveyor network, which supplies the retrieval pallets to the system according to the invention and carries the order pallets away from the system according to the invention.

In the case of the present embodiment, the pallets 50 are stored in multi-storey pallet racks 52 (cf. FIG. 2), in which the pallets are stored transversely and three deep. For picking, the articles are provided in picking channels 54 on at least one plane, wherein each picking channel may accommodate three pallets one behind the other. As illustrated, a plurality of picking planes are arranged one above the other.

The placing of retrieval pallets into storage in the stock area and the feeding of retrieval pallets into the picking channels is effected by means of the rack attendance unit 56 which, as FIG. 1 reveals, may attend in each case two adjacent opposing racks. As the automatic rack attendance units 56 may be of a conventional design, there is no need for a more detailed description. Placing the retrieval pallets into storage is effected preferably via the picking provision system (not visible in the drawing) of the pallet racks 52.

Two rack rows 60, 62 plus a rack attendance unit 56 form in each case a module 58, along the two picking fronts of which the pickers complete order pallets. The pallets from the incoming goods department are supplied in each case to the desired module for storage. Said supply is effected preferably by an automatic conveyor system. To the extent that the actual shelf capacity allows, the incoming goods pallets of an article are stored in the module, in which they are also lined up in the picking system. Thus, the stock of an article is as far as possible held in the module, in which it is also picked. If not all of the pallets may be stored in the appropriate module, they have to be relocated at a later time or subsequently supplied from the supply storage area.

The articles are lined up in the picking system statically and/or dynamically. Permanent pick-up locations in the picking system are allocated to articles with a high turnover (static line-up). In the static channels a plurality of pallets of the respective article may be provided one behind the other. Picking is effected from the front pallet, the pallets behind are provided as stock. As soon as the front pallet has been emptied, the pallet is removed by the picker and the follow-up pallets automatically roll forward on the gravity roller conveyors 55 of the picking channels 54. The zero crossing acknowledgement of the picker triggers the provision of a new pallet from the stock area. The empty storage pallet is reused for a new order or disposed of in an empty pallet dispenser.

In the case of unstable storage goods, the inclination of the gravity roller conveyors may be varied in such a way that "automatic forward rolling" does not occur. The supply vehicle then has the function of using a new supply pallet from the storage area to push the reserve pallet (second pallet in the rack) into the channel. As the reserve pallet is not immediately available for picking (dependent on the supply frequency and the occurrence of supply), the picker vehicle has an automatic pulling device, by means of which the reserve pallet may be actively pulled "to the front".

To reduce the picking front, articles with a low turnover are lined up in the picking system dynamically, i.e. only when actually required. For said purpose specific picking channels are defined, at which articles are provided dynamically. When there is a request from the picking system for a dynamic article, the latter is lined up at the dynamic location and, upon the request for a new article, is removed and returned to the stock area.

As it is known in advance which order pallets are being channelled through the picking aisle, the dynamic line-up of articles is effected before the start of the order in order to guarantee the availability of the articles at the picking front.

As all of the picking channels of the present installation are equipped so as to be usable both for static and for dynamic provision, it is possible, where necessary, to redefine a static picking channel as a dynamic picking channel and vice versa.

The article line-up is continuously adapted to the prevailing requirements. On the basis of records (history) and prognoses and/or already existing orders the store-keeping computer at regular intervals determines an optimum article line-up in the picking system (profile). When there is more than a specific variation of the actual profile from the optimum profile, the picking front is reorganized (reprofiling). The design of the channels allows an automatic return of a lined-up pallet to the storage area. If a static article is to be changed, the appropriate pallets are removed from the channel. The channel may then be either statically or dynamically reassigned.

The individual orders may be apportioned to dispatch aids. From the dimensions of the articles according to the master data the number of pallets needed for each order is determined with the aid of an accommodation program and the order is divided up among the pallets. In said case, specific optimization criteria may be taken into account, e.g., the keeping-together of categories of goods on one pallet, weight criteria or minimizing the modules to be visited for one pallet.

From the pool of possible order pallets, order pallets are started in accordance with specific criteria. An order pallet may be started at any desired module. The start criteria take into account the departure time of the trip and the loading of the rack attendance unit for dynamic article provision at the starting module. Order pallets arc preferably started at the module where the heavy articles are lined up. The order pallet is then steered through the other modules where articles for the order are likewise lined up. An important feature is also that categories of goods within the article spectrum may be kept together; i.e. they are kept together in one picking area. This enables "category-pure" order pallets.

At said point it should be mentioned that the system according to the invention is suitable for the use of a plurality of different storage units for receiving the respective goods and/or articles. Said storage units include pallets 38 (FIG. 2) or small load carriers 80 (FIG. 14) as well as rolling containers or package units (collies) of the good. Rolling containers are placed individually or in pairs onto supporting pallets at the start of the order. The supporting pallets then serve as transport aids for the rolling containers in the system. The package units or collies are provided directly in through-channels or bay bottom racks in the picking area. This removes the need for repacking into containers. A prerequisite of this is that the collies are stable, have suitable dimensions and represent a sales unit.

Figure 4:
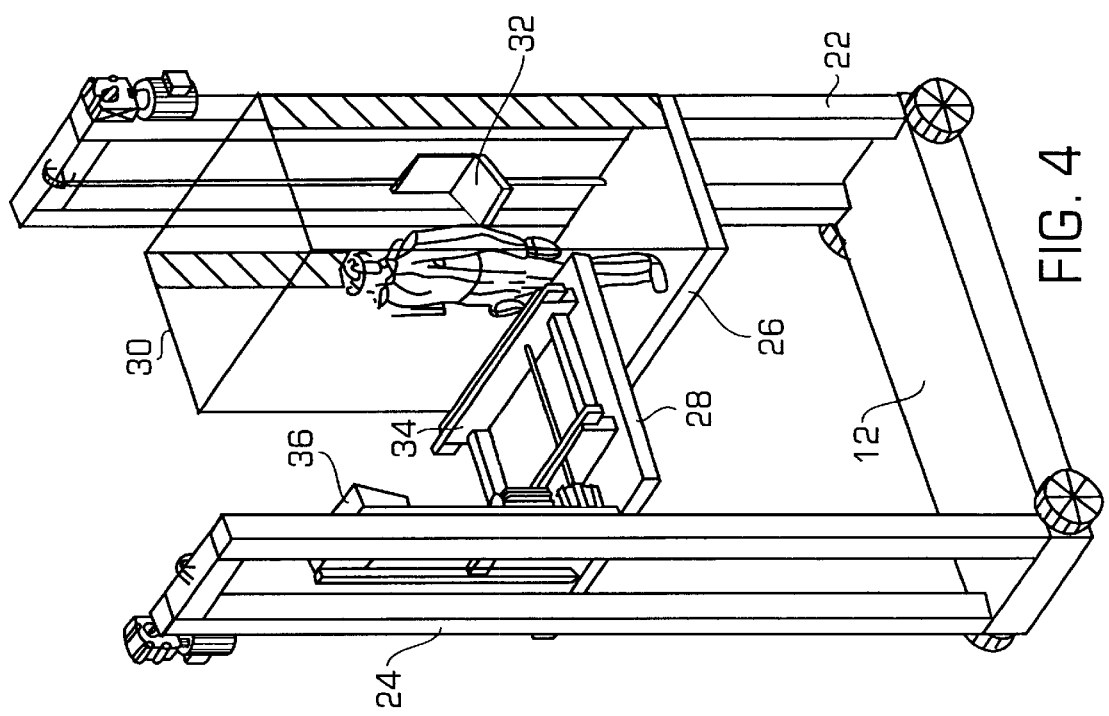
Figure 3:
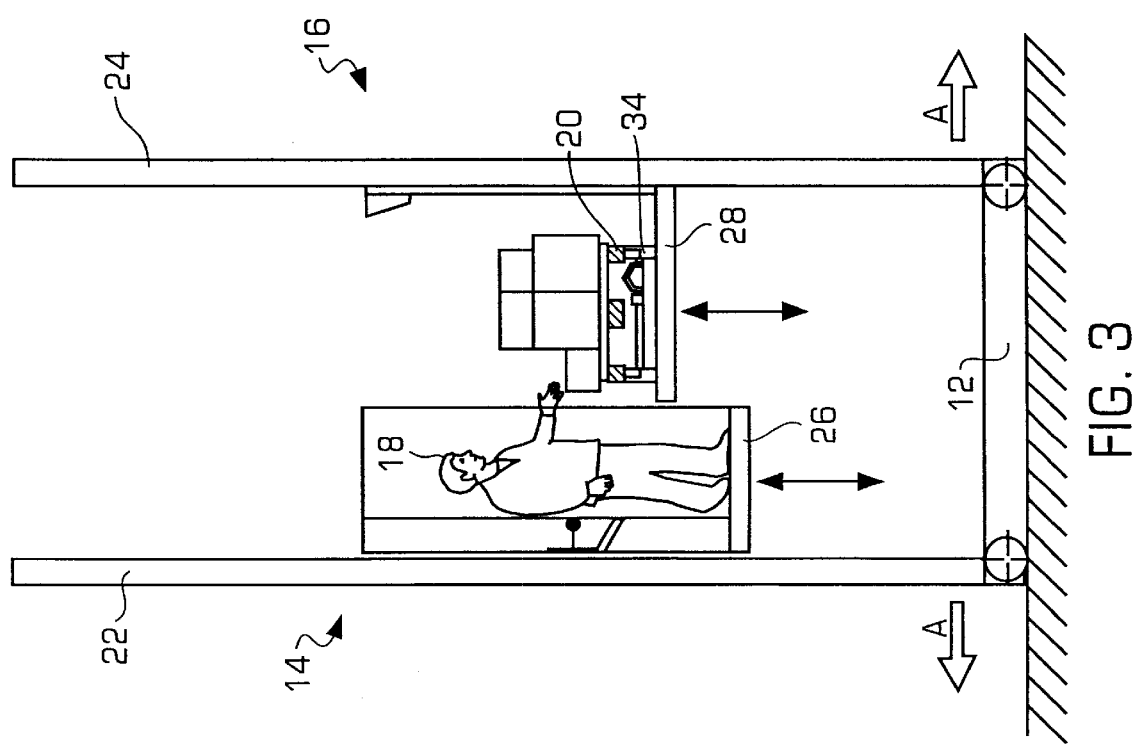
FIG. 3 a side view of a picker vehicle of the kind used in the system according to the invention, FIG. 4 a perspective view of the picker vehicle according to FIG. 3, FIGS. 5a, 5b, 6a, 6b, 7a, 7b, 8a, 8b, 9a, 9b, 10a, 10b, 11a, 11b and 12a, 12b front views and side views of the picker vehicle, which illustrate examples of the different levels for the picker-carrying device and the pallet-carrying device, FIG. 13 a plan view of a further embodiment of the system according to the invention, and FIG. 14 a cutout from a vertical section through the system of FIG. 13.
Figures 5A, 5B:
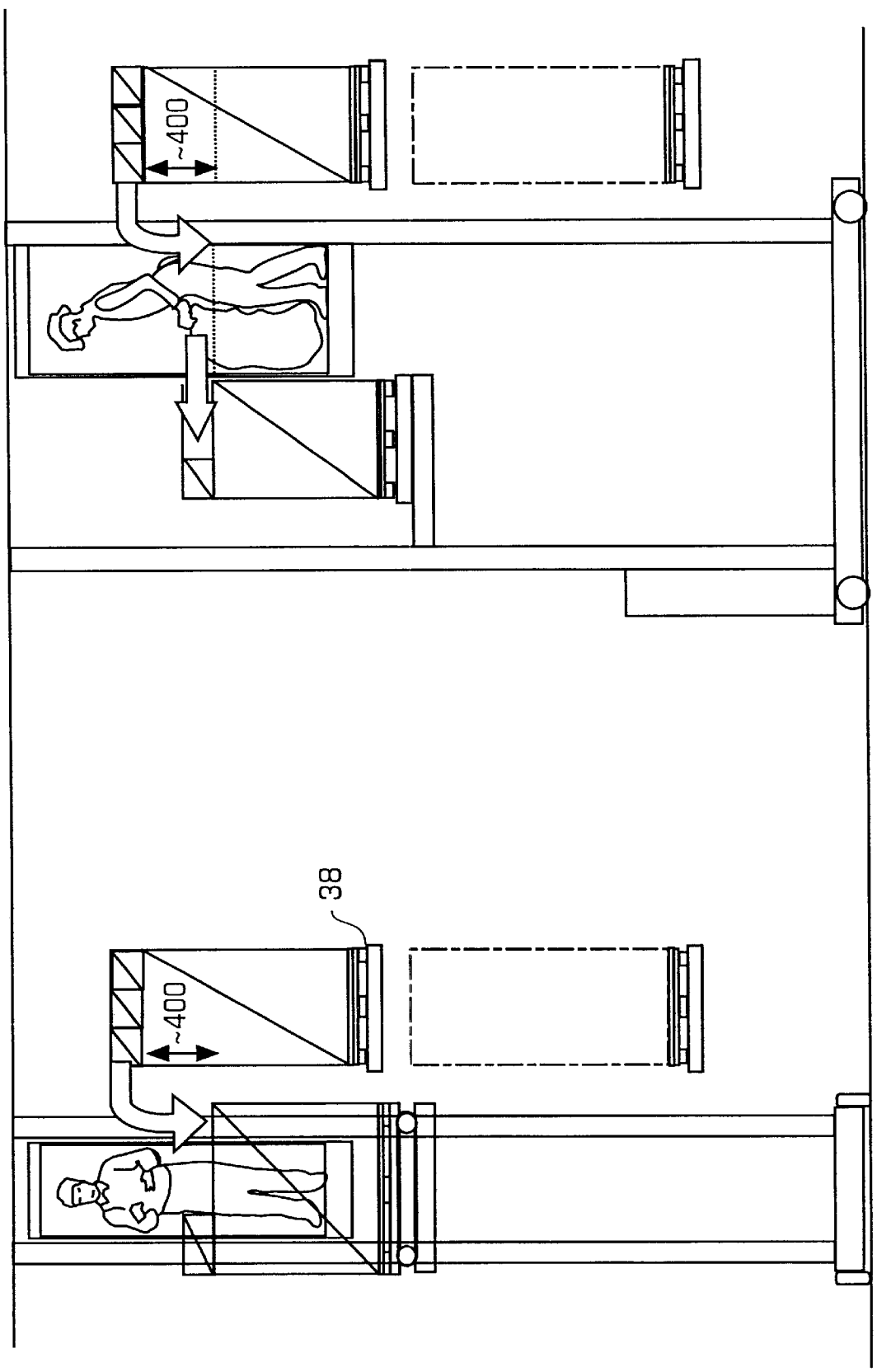
Figures 6A, 6B:
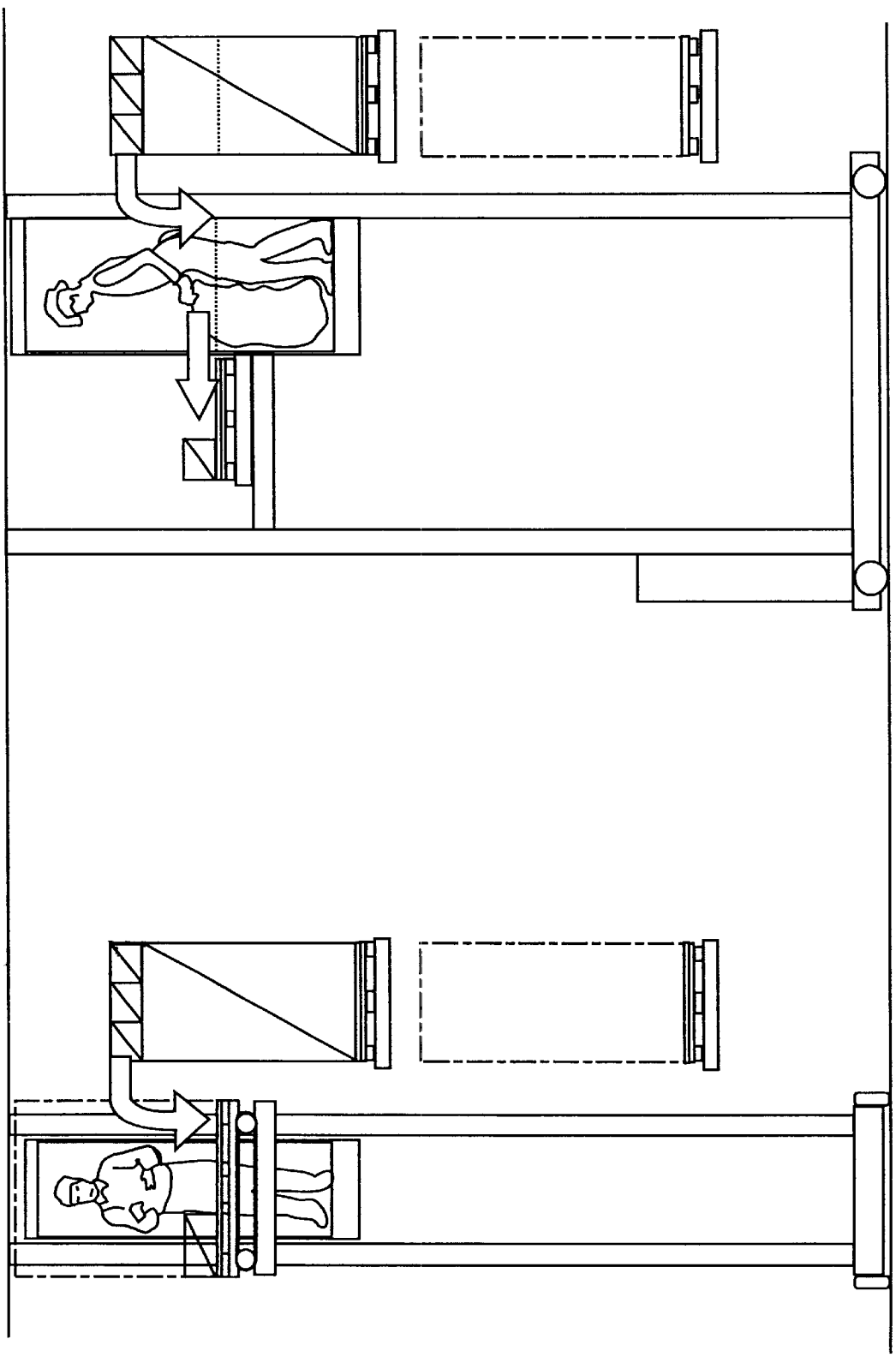
Figures 7A, 7B:
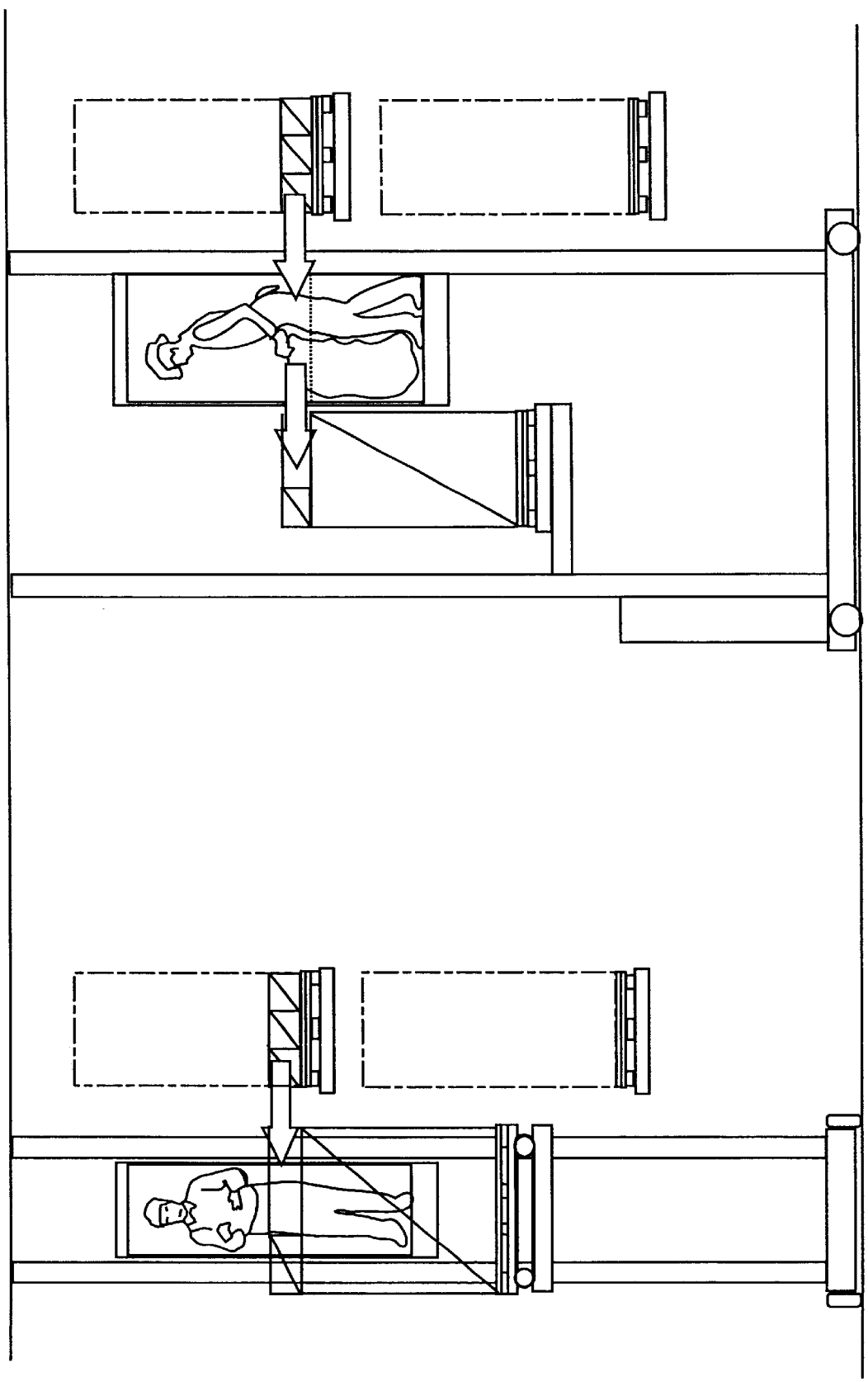
Figures 10A, 10B:
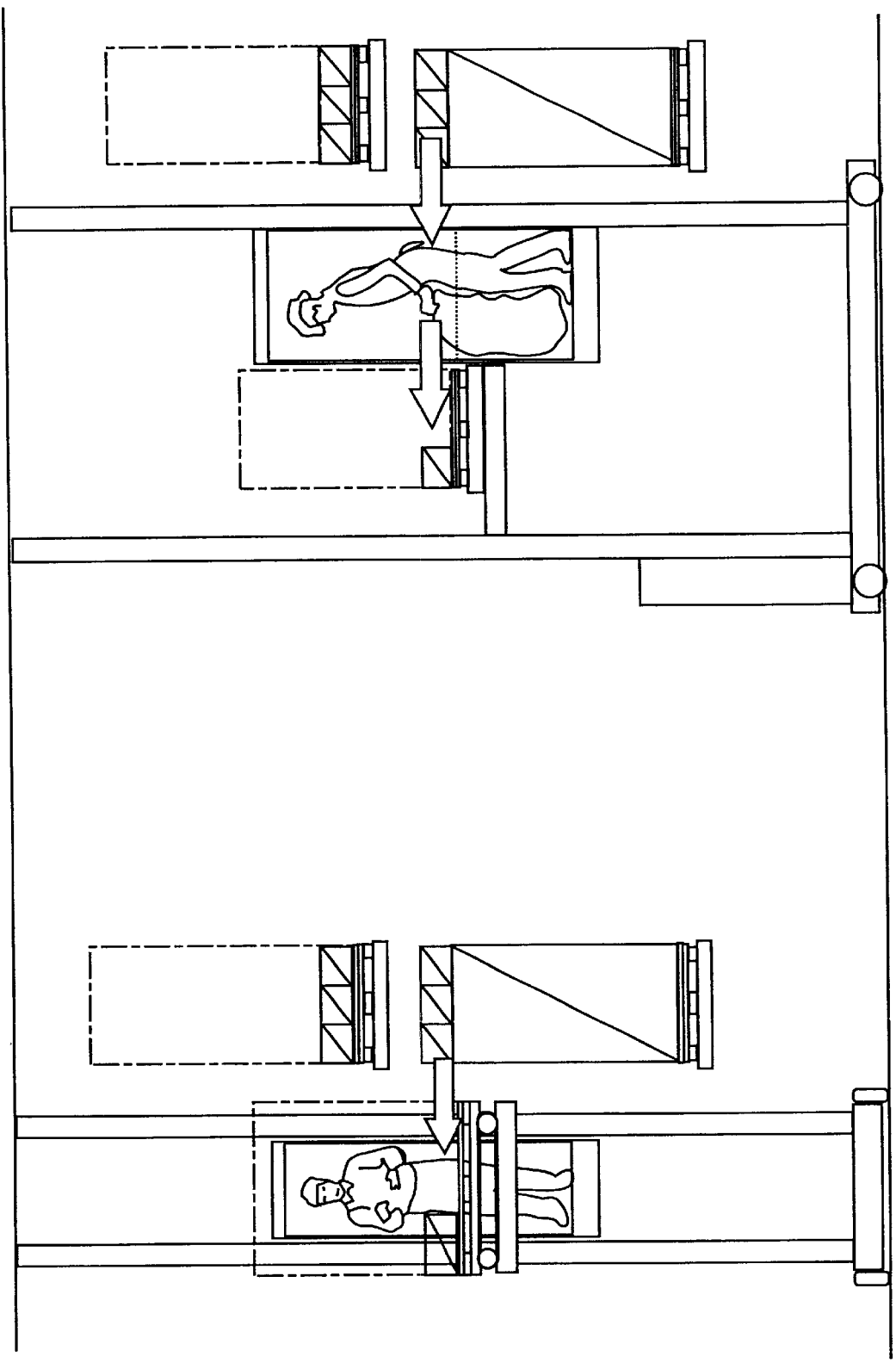

For picking, use is made of picker vehicles 10 of the kind described in detail below with reference to FIGS. 3 and 4. Said picker vehicles are hereinafter also referred to as "ergonomic picking mobiles" or "EPMs" for short The "ergonomic picking mobile" 10 is a rail-mounted vehicle comprising a chassis 12 with travelling gear, wherein the travelling direction of the EPM is indicated in FIG. 1 by the arrows A and extends parallel to the picking front of the pallet racks. The EPM comprises a first lifting device 14 for the picker 18 and a second lifting device 16 for an order pallet 20. Each lifting device 14, 16 comprises a frame 22 or 24, which is fastened to the—viewed in travelling direction of the EPM—front or rear end of the chassis 12 so as to extend vertically upwards and along which in each case a platform 26 or 28 is guided in a height-adjustable manner. The two platforms 26, 28 in plan view are adjacent, leaving only a comparatively narrow gap between them, and they are adjustable in height independently of one another by means of the respectively associated lifting devices 14, 16 in such a way that the platform 28, for example, may be higher than, level with, or lower than the platform 26.

The platform 26, which is used to accommodate the picker 18, is equipped with a cabin having a circumferential crash guard 30, a driver's seat and an integrated dead man's switch 32. The driver's seat is designed as a standing seat for an ergonomic position during travel. Further safety equipment which is not shown in detail is likewise provided, such as e.g. means of preventing the vehicle from being set in motion when the picker is still busy outside of the vehicle (e.g. transferring the pallet) after the pick has been acknowledged, or means of preventing crushing as a result of movement of the order pallet relative to the platform. The dead man's switch 32 is used simultaneously to acknowledge the pick.

A load-receiving means 34 for the order pallet 20 is disposed on the platform 28, wherein the load-receiving means 34 enables a movement of the order pallet 20 at right angles to the travelling direction A of the EPM. The platform 28 moreover carries a terminal 36 for displaying the picking positions.

The EPM is controlled by the control computer (not shown) of the system controller, which on the one hand positions the vehicle and on the other hand places both the picker and the order pallets in the, in each case, ergonomically most advantageous position at the respective retrieval position of the retrieval pallet situated in the pallet rack. Examples of this are illustrated in FIGS. 5a to 12b.

Setting of the picking platform to an ergonomic height is effected on the basis of the residual stock quantity on the retrieval pallet 38. Setting of the height of the platform 28 carrying the order pallet 20 is effected on the basis of the degree of charging of the order pallet, which is evaluated by sensor equipment disposed on the platform 28. The optimum access height may in said case be geared in the controller also individually to the respective picker. The picker moreover also has the possibility of manually correcting the heights preset by the controller. Control of the travel in aisle direction, on the other hand, is effected fully automatically without the possibility of intervention by the picker.

The order pallets are channelled by the EPMs and the supply vehicles successively through the picking fronts where articles for the order pallet are lined up. An important feature is also that categories of goods within the article spectrum may be kept together; i.e. they are kept together in one picking area, which may comprise a plurality of successively disposed modules. This enables "category-pure" order pallets. When a plurality of EPMs are in use at a picking front, the pallet is deposited on one of the buffer locations 64 and taken over by the next EPM. In order to switch between two opposing picking fronts, the pallet is likewise deposited on buffer locations between the picking fronts and taken over by an EPM of the other picking front. Switching to the other side of a module is effected via buffer tracks 66 constructed in the racks 52 as well as via the respective rack attendance unit 56 of the associated module 58. Where a plurality of picking fronts are to be skipped, the pallet may be passed on to the next relevant module via the conveyor network 68.

For picking the order items, first an order pallet 20 is provided by the rack attendance unit 56 on a buffer track 66 in the pallet rack 52 for takeover by an EPM 10 (or an empty pallet is provided). The pallet is received by the load-receiving means 34 of the EPM, which then travels automatically to the first retrieval position. The retrieval pallets 38 are already in place at the picking front. Positioning of the EPM in front of the retrieval pallet at the picking front is effected fully automatically by means of the control computer in lateral directions. For information about the actual picking, the terminal 36 is provided on the EPM and displays the retrieval quantity. Once positioned in front of the respective channel 54, the picker may check the retrieval position and he then retrieves the displayed quantity and transfers the parts to the order pallet 20. For said process the platform 26 of the picker is adjusted in such a way as to provide an ergonomic removal height from the retrieval pallet for the picker. The order pallet is vertically adjusted in such a way that the retrieved parts may, as far as possible, be pushed over onto the order pallet without having to be lifted or lowered by the picker. After the transfer, the picker acknowledges the retrieval position. The EPM automatically positions itself in front of the next retrieval pallet or transfers the order pallet to a buffer location 64 once the order pallet in the picking area of the EPM has been completed.

At each picking front there is at least one picker operating on one EPM, although two EPMs may also be employed at a picking front. In the case of two EPMs at a picking front, the operating areas of the individual EPMs may overlap. The controller for the order pallet takes into account an optimization of the route of the picker and therefore enables a maximum picking capacity. On completion of picking in the operating area of the respective EPM, the order pallet is deposited on a buffer location in order to be passed on to other areas.

After the last pick the order pallet 20 is transferred via a buffer track 66 to a rack attendance unit 56 and deposited by the latter onto a suitable conveyor system and moved to a dispatch area, where sorting of the order pallets into orders and optionally consignments is effected.

The EPMs may travel with a fully extended lift without difficulty and a combined lifting/travelling motion may be realized with the EPM. Thus, the vertical positioning is effected substantially during the actual travelling time and therefore does not take up extra time. The fact that the order pallet constantly accompanies the picker eliminates journey times from the retrieval pallet to the order pallet.

The conveyors of the system according to the invention enable storing into any desired module. To allow order pallets to be started at any picking module, a supply of empty pallets to the input point of each picking module is moreover easily possible. By means of the conveyors removal of the empty pallets from each module is also guaranteed. Finally, for the individual picking modules there is a conveyor network which allows an order pallet to be channelled in any desired order through the modules.

In the case of high racks, it is also possible to use a plurality of picking vehicles one above the other on intermediate stages within the aisles. The storage and supply vehicle in said case covers the entire rack height and is therefore also the "conveying connection" of the storage units of the picker vehicles disposed one above the other.

As is apparent from the above, the system according to the invention in particular offers the following advantages: 1) integrated system for the storage and picking of pallets; 2) multi-deep provision of goods pallets for continuous picking supply; 3) reduction of picking front possible as a result of dynamic article provision; 4) identical design of static and dynamic K locations; 5) allows maximum flexibility for article line-up; 6) optimum provision as a result of automatic picking front profiling and dynamic provision of slow-moving articles; 7) no sequence of order pallets; 8) high picking capacity; 9) pickers separated by buffer conveyors between EPMs; 10) journey times minimized as a result of route optimization and transport of picker on the EPM; 11) optimally ergonomic retrieval process by virtue of lifting cabin for workers; 12) optimally ergonomic delivery onto the order pallet as a result of independent lift for order pallet; 13) transverse provision of storage pallets; maximum depth of engagement 800 mm; 14) high level of picking safety as a result of sequential, computer-controlled travel to retrieval positions; 15) order may be started at any point of the installation (no central I point); uniform utilization of the installation; 16) single-stage picking directly onto the dispatch aid; only one handling stage; 17) suitable profiling allows picking by article category in any desired order of article category; 18) completion times optimized by prioritization and the possibility of overtaking order pallets; and 19) automatic transportation of the order pallet from order start to dispatch orientation.

Second embodiment: system for picking pallets and storage containers

Figure 13:
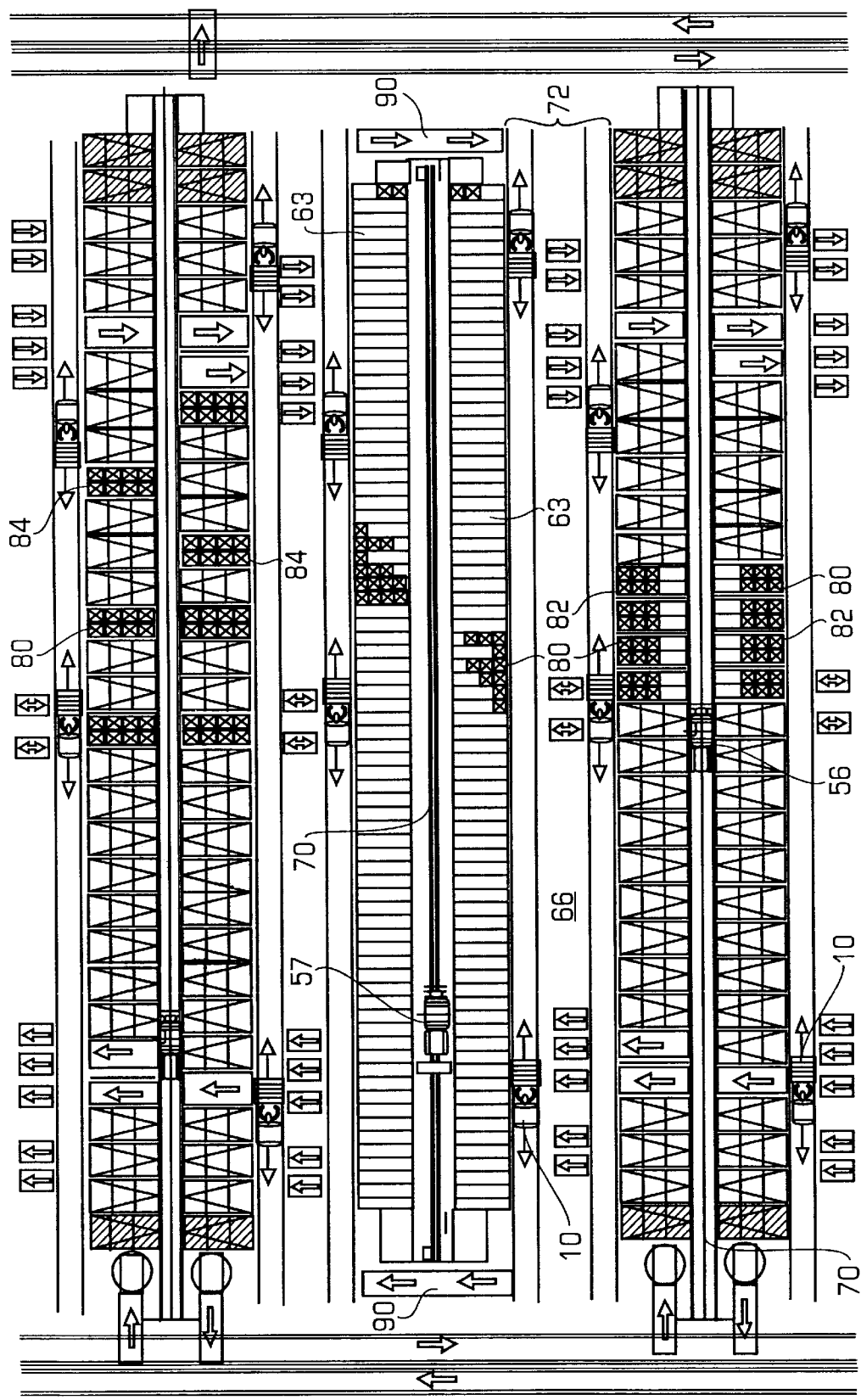
Figure 14:
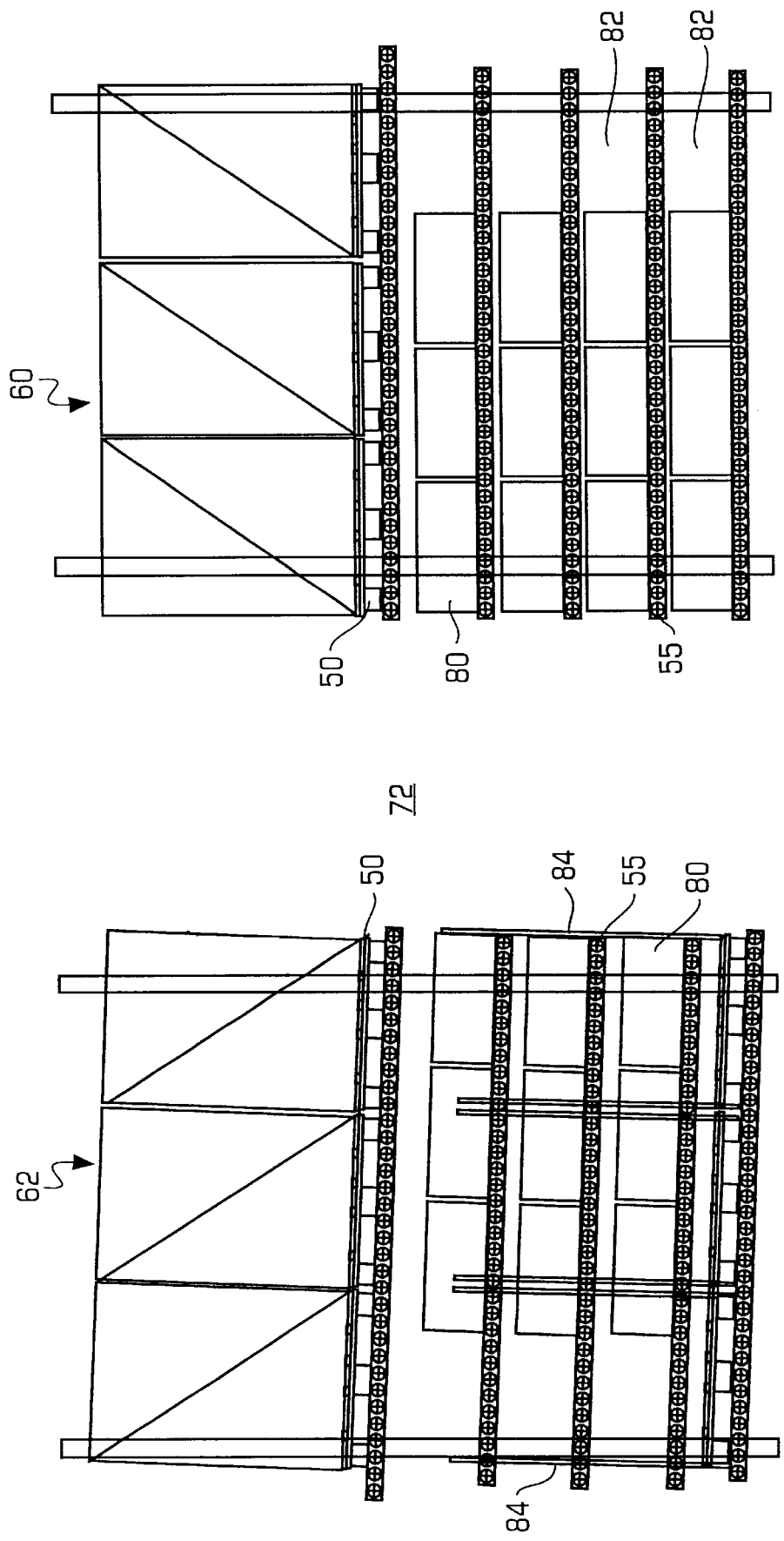

There now follows a description of a further embodiment of the system according to the invention with reference to FIGS. 13 and 14.

FIG. 13 shows a diagrammatic plan view of an embodiment of the system according to the invention, which allows the integrated storage and picking of pallets and additionally of storage containers 80 (small load carriers KLT) for smaller articles. FIG. 14 shows a partial cross-sectional view of such a system.

Said second embodiment of the picking system according to the invention is usable in particular for articles which have a low consumption volume ([number of units]×unit volume) and which, in terms of their physical dimensions, are too small and/or unsuitable for storage on pallets. For their storage use is therefore made of storage containers or small load carriers (KLTs 80), which may take the form of either a trough or tray. The system according to the invention allows a reduction of the picking front for such articles and hence a reduction of the picking distances. By said means a higher picking capacity and shorter order completion times are achieved.

For storing and picking KLTs 80, three different variants are possible.

(1) Storage and Provision of KLTs in Specific Deposit Locations and/or Deposit Channels in the Pallet Module Said variant is illustrated in FIG. 13 in the rack module shown right at the bottom as well as in FIG. 14 on the righthand side. The KLTs are stored in specific deposit locations, which are appropriate for the dimensions of the KLTs, and provided in the picking system in specific storage channels 82, which are adapted to the dimensions of the KLT. The deposit locations and the picking channels 82 are integrated in the pallet rack. As a result, there is a combination of pallet deposit locations (shown at the top of FIG. 14) and KLT deposit locations (shown at the bottom of FIG. 14) both in the storage area and in the picking area.

Storage of the KLTs 80 may be effected longitudinally or transversely depending on which alignment is more suitable for integration of the storage channels in the steel structure of the pallet rack. Depending on the deposit space available, a plurality of KLTs 80 may be provided one behind the other. In said case, the KLTs rest on inclined roller conveyors 55.

Storing of the storage containers 80 into the supply locations and/or supply of the storage containers into the picking channels 82 is effected, as with the pallets, by means of a preferably automatic rack attendance unit 57 (not shown in FIG. 14), which comprises a special load-receiving means capable of handling both pallets and KLTs. Preferably, two telescopic forks for pallet handling are separately controllable and designed in such a way that a single telescopic fork may be used to manipulate the KLTs. It is also alternatively possible for the storage and supply processes to be carried out by a manual stacker, which is controlled by radio data transmission. Said stacker too is preferably capable of manipulating both pallets and KLTs.

As in the case of the pallets, the two provision methods of static and dynamic provision may be applied. In said case, of the pool of articles, which are stored and placed in the picking system in KLTs 80, those with a high access frequency are lined up statically and those with a low access frequency are lined up dynamically. In the case of static line-up a plurality of KLTs of an article are placed one behind the other into a storage channel 82, while in the case of dynamic line-up always only one KLT is moved into the channel 82 and, when required, is removed before a new article likewise only in one container is supplied.

(2) Provision of KLTs in Mobile Through-channel Inserts in the Pallet Module

Said second variant is illustrated in FIG. 13, rack module shown right at the top, and in FIG. 14 on the lefthand side. As with the first variant, the KLTs are stored in specific deposit locations corresponding to the dimensions of the KLT. Said deposit locations are introduced in mobile storage channel inserts 84 for the KLTs into the pallet channels. Said storage channel inserts 84 are carrier units, which have the basic dimensions of a pallet and on which roller rails 55 are installed for provision of the KLTs 80 on a plurality of planes one above the other. Once a pallet channel has been equipped with the appropriate number of mobile storage channel inserts 84 (through-channel inserts), a plurality of KLT storage channels have de facto been set up.

In said embodiment, provision in the picking system does not involve any alterations to the steel structure of the pallet rack. The mobile storage channel inserts 84, because of their basic dimensions, may be handled by the rack attendance unit 56 and therefore assembled and disassembled at any desired points in the picking front. It is therefore possible to respond flexibly to changes imposed on the article profile, such as e.g. variation of the number of articles in KLTs, different positions in the picking front etc.

With said variant also, both static and dynamic article provision are possible.

(3) Storage and Provision in a Separate Module for Storage Containers

In the case of said third variant, the KLTs 80 are provided and placed in the picking system in at least one module comprising two complete picking fronts 63 exclusively for KLTs. Said variant is illustrated in the middle of FIG. 13. The two picking fronts 63 are disposed in such a way that the charging sides of the rack rows are directed towards one another so that the rack attendance unit 57 used has to manipulate only KLTs.

With said variant, standard systems are preferably used for the steel structure of the rack specially designed for storage of the containers 80. The KLTs are, as a rule, stored longitudinally two deep, the through-channels for provision in the picking system are preferably three deep.

Charging of the racks with stock and feeding into the picking channels is preferably effected by means of a rack attendance unit 57, which is designed to accommodate two KLTs one behind the other. Provision of the KLTs in the picking front may, as in the case of the two previously described variants, be effected statically or dynamically.

As the order pallets in said case may not be transferred via buffer conveyors to the rack attendance unit and from the latter in turn to opposing buffer conveyors, for said purpose preferably at least one buffer conveyor 90 is installed at either end of the rack for transferring pallets from one picking aisle 72 to the next picking aisle (see FIG. 13).

Operating Principle of the Second Embodiment

There now follows a description of the working processes of the second embodiment of the picking system according to the invention.

(1) Repacking of Articles Into KLTs

Before being used in the picking system, articles intended for picking from KLTs may be removed from pallets and repacked into KLTs. Said process may be effected at special work stations (not shown in the drawings) situated outside of the system or integrated in the picking system. In the case of separate work stations, article pallets and empty KLTs are provided there and the KLTs, once packed, are automatically provided by conveyors for storage in the rack modules.

The repacking process is effected, irrespective of the nature of provision of the KLTs (previously described variants 1 to 3) in the picking front, in accordance with the following sequence: along a pallet channel empty KLTs on pallets are provided and at a pallet location situated alongside the article pallets to be repacked are provided. A load-receiving means receives an empty KLT and, under computer control, repacks the appropriate quantity. The container, having been packed and identified, is supplied via permanently installed conveying tracks for KLTs to the rack attendance unit for placing into storage.

The empty containers arising in the picking system are transferred back onto the empty container pallets, thereby guaranteeing the supply of empty pallets for the repacking process.

(2) Storage/feeding Into the Picking System

The rack attendance unit uses a telescopic device to pick up the KLT supplied for storage from a conveying track and deposit it at the appropriate storage locations in the stock area of the rack module. Supplying of the channels in the picking system is effected according to the same principle as in the first embodiment (see description above). Empty KLTs are removed from the channel, collected by the picker vehicle and disposed of, where necessary.

(3) Continuous Reprofiling of the Article Line-up

Continuous reprofiling of the article line-up may be effected for the KLT subsystem in the same manner as in the first embodiment. A reassignment from KLTs to pallets and vice versa may also be effected in dependence upon the article turnover behaviour. For this, any residual KLTs are used up and/or stock quantities are repacked into KLTs and then correspondingly provided.

Given a system design having mobile storage channel inserts 84 (second variant of the second embodiment), the number of KLT channels in the picking front and the location of said channels may also be modified flexibly and in accordance with requirements. In order to reorganize the local installation of the storage channels, the latter have to be completely emptied. The rack attendance unit may then remove the individual mobile storage channel inserts and reinstall them in another pallet channel.

(4) Order Completion (Splitting of Order Pallets, Control of Order Pallets, Picking and Provision for Dispatch)

Completion of the order by the system is effected in the same manner as in the first embodiment and is unaffected by the provision of articles in KLTs.

(5) Design of the Conveyor System

When designing the conveyor system, additional account has to be taken of the fact that, optionally, KLTs have to be conveyed along specific sections (storage, connection to repacking stations). For said purpose, a separate conveyor network has to be installed. The conveyor installation for order completion remains unaffected thereby.

As is evident from the above detailed description, the second embodiment of the picking system according to the invention in particular offers the following further advantages: 1) integrated system for the storage and retrieval of pallets and KLTs; 2) picking from pallets and KLTs in one system onto a dispatch unit, combined with optimally ergonomic retrieval; 3) storage and retrieval of articles in accordance with turnover behavior and turnover volume in KLTs or in pallets; 4) reassignment between pallet and KLT is possible at any time; 5) multi-deep provision of KLTs in the picking front; 6) drastic reduction of the picking front for slow-moving articles by providing the latter in KLTs (ca. six articles on one pallet deposit location); 7) further reduction of the picking front possible as a result of dynamic provision of the KLT articles; 8) identical design of static and dynamic locations allows maximum flexibility for the line-up of KLT articles; 9) optimum provision as a result of automatic picking front profiling and dynamic provision of slow-moving articles in the KLT area; 10) suitable profiling allows picking by article categories in any desired order of article category; and 11) a supply rack attendance unit for manipulating pallets and KLTs.

In the case of the second variant of the second embodiment, the use of mobile storage channel inserts 84 gives rise to additional advantages and special features, some of which include flexible assignment of pallet channels and KLT channels to the picking front, reorganization of the picking front possible also with regard to the number and location of KLT storage channels, flexible response to changing requirements, categories of goods may be kept together even when the number of KLT articles in the category of goods changes, and relocation of the channel inserts is possible by means of an automatic supply rack attendance unit.

What is claimed is:

1. A system for picking articles situated in a rack storage unit, comprising:
   rows of pallet racks for storing a receiving unit wherein the receiving unit receives the articles,
   storage aisles and picking aisles formed alternately between the rack rows,
   at least one storage vehicle in each of the storage aisles, wherein the storage vehicle is designed to accommodate at least one receiving unit and is capable of traveling along each storage aisle to place the units into storage in the pallet racks,
   at least one picker vehicle in each of the picking aisles for picking the receiving unit, which vehicle is capable of traveling along one of two mutually opposing picking fronts forming the picking aisle,
   buffer locations disposed in the picking aisles between the routes of the picker vehicles traveling between two opposing picking fronts for at least one of temporary storage and transfer of the articles from a first picker vehicle at one side of the picking aisle to a second picker vehicle at the other side of the picking aisle, and
   a system controller including a control computer.

2. The system according to claim 1, wherein the at least one picker vehicle is designed to accommodate order pallets that support the articles.

3. The system according to claim 2 further comprising at least one buffer track constructed in the pallet racks, the at least one buffer track transferring order pallets from a picker vehicle to a storage vehicle and from the storage vehicle optionally to a picker vehicle of an adjacent picking aisle.

4. The system according to claim 1, wherein the receiving units to be picked comprise at least one of pallets, rolling containers, load containers, collies and package units.

5. The system according to claim 1, wherein the rack rows comprise pallet racks, in which storage channels for at least one of containers and package units (collies) are formed.

6. The system according to claim 5, wherein at least one of the containers and the package units are stored in the storage channels next to one another.

7. The system according to claim 5, wherein the storage vehicle is provided with a load-receiving means for handling pallets and load containers.

8. The system according to claim 4, wherein the storage channel inserts for receiving containers are provided in at least one pallet rack.

9. The system according to claim 8, wherein the storage channel inserts correspond to the basic dimensions of a pallet and comprise roller rails for the storage of storage containers on a plurality of planes one above the other.

10. The system according to claim 1, further comprising rack modules including two parallel rack units disposed on either side of a storage aisle, wherein at least one of the rack modules is designed as a rack module for the storage of containers.

11. The system according to claim 10, wherein separate buffer conveyors are disposed at either end of the rack module.

12. The system according to claim 4, wherein the storage containers take the form of trough- or tray-shaped carriers for smaller articles.

13. The system according to claim 1 further comprising picking channels formed at the rows, wherein both static and dynamic picking channels are formed at the rack rows.

14. The system according to claim 13, wherein at least some of the picking channels of the racks are designed so as to be usable both as static and as dynamic picking channels.

15. The system according to claim 1, wherein it comprises control means for determining on the basis of at least one of records, prognoses, and present orders the optimum article line-up in the picking channels and, in the event of a variation from the optimum article line-up, reorganizing the picking front.

16. The system according to claim 4, wherein, upon reorganization of the picking front, the static or dynamic nature of the picking channels is variable.

17. The system according to claim 1, wherein the picking channels of the pallet racks hold multiple pallets.

18. The system according to claim 1 further comprising picking channels at the rows, wherein pallets are receivable transversely in the picking channels of the pallet racks.

19. The system according to claim 1 further comprising picking channels at the rows, wherein the picking channels are disposed in the pallet racks in a plurality of planes one above the other.

20. The system according to claim 1, wherein the storage vehicles take the form of automatic rack attendance units and supply vehicles for handling containers.

21. The system according to claim 1, wherein one storage vehicle is provided for each storage aisle, wherein the storage vehicle attends pallet racks facing one another in a storage aisle.

22. The system according to claim 1, wherein picker vehicles are provided for at least one picking front of a pallet rack.

23. The system according to claim 1 further comprising a pallet conveyor system which is disposed on at least one end of at least one of the storage aisles and the picking aisles and extends at right angles to the aisles.

24. The system according to claim 1, wherein the picker vehicle is designed so as to accommodate a picker.

25. The system according to claim 24, wherein the picker vehicle comprises a first section that carries an order pallet and a second section that carries the picker wherein the first section and the second section are height-adjustable independently of one another.

26. The system according to claim 24, wherein the picker vehicle carries the order pallet in a height-adjustable manner relative to the pallet racks.

27. The system according to claim 24, further comprising a first lifting device with a height-adjustable picker-carrying device for the picker and a second lifting device having a height-adjustable pallet-carrying device for an order pallet, wherein height of the picker-carrying device and height of the pallet-carrying device are adjustable relative to the respective retrieval position independently of one another.

28. The system according to claim 27, wherein the picker vehicle comprises a base on which, viewed in traveling direction (A), the first lifting device is disposed on one end and the second lifting device is disposed at the other end.

29. The system according to claim 28, wherein each lifting device comprises a vertical frame, along which the respective carrying device is vertically displaceable.

30. The system according to claim 27, wherein the picker-carrying device and the pallet-carrying device are disposed near two surfaces of the picking vehicle that are opposite one another.

31. The system according to claim 1, wherein the picker vehicle is rail-mounted.

32. The system according to claim 27, wherein the picker-carrying device comprises a circumferential crash guard for the picker.

33. The system according to claim 27, wherein, above the order pallet, the pallet-carrying device comprises a terminal for displaying the picking quantity.

34. The system according to claim 27, wherein the picker-carrying device comprises a dead man's switch.

35. The system according to claim 34, wherein the dead man's switch is additionally designed for acknowledgement of the pick.

36. The system according to claim 27, wherein the pallet-carrying device comprises a load-receiving means for receiving and delivering the order pallet.

37. The system according to claim 36, wherein the load-receiving means is designed so as to enable transporting of the order pallet at right angles to the traveling direction (A) of the picker vehicle.

38. The system according to claim 27, wherein the pallet-carrying device comprises a sensor device for determining the degree of charging of the order pallet.

39. The system according to claim 27, wherein travel of the picker vehicle and of the lifting devices to the respective retrieval positions and/or transfer positions is controllable by means of a control computer of the system controller.

40. The system according to claim 39, wherein the height of the picker-carrying device at the respective retrieval position is controllable on the basis of the residual stock quantity of the articles on the retrieval pallet.

41. The system according to claim 39, wherein the height of the pallet-carrying device at the respective retrieval position is controllable on the basis of the degree of charging of the order pallet.

42. The system according to claim 40, wherein the height of the picker-carrying device and/or the pallet-carrying device at the respective retrieval position is correctable by a specific amount individually for each picker.

43. The system according to claim 39, wherein the heights preset by the system controller are manually correctable by the picker.

44. The system according to claim 27, wherein the traveling movement of the vehicle and the lifting movements of the lifting devices are optionally effected simultaneously.

45. The system according to claim 2 further comprising at least one buffer track constructed in the pallet racks, the at least one buffer track transferring order pallets from a storage vehicle to a picker vehicle.

* * * * *